United States Patent
Kim et al.

(10) Patent No.: US 10,151,330 B2
(45) Date of Patent: Dec. 11, 2018

(54) THREE-STAGE HYDRAULIC ACTUATOR AND METHOD OF OPERATING THE SAME

(71) Applicant: Agency For Defense Development, Daejeon (KR)

(72) Inventors: Taehyeong Kim, Daejeon (KR); Yoonjae Kim, Seoul (KR); Changwon Shul, Daejeon (KR); Jaechang Ha, Daegu (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 311 days.

(21) Appl. No.: 14/558,232

(22) Filed: Dec. 2, 2014

(65) Prior Publication Data

US 2015/0152896 A1   Jun. 4, 2015

(30) Foreign Application Priority Data

Dec. 3, 2013  (KR) ........................ 10-2013-0149419

(51) Int. Cl.
*F15B 15/22*    (2006.01)
*F15B 1/24*     (2006.01)
*G01M 7/08*     (2006.01)

(52) U.S. Cl.
CPC .............. *F15B 1/24* (2013.01); *F15B 15/221* (2013.01); *G01M 7/08* (2013.01); *F15B 15/224* (2013.01); *F15B 2201/32* (2013.01); *F15B 2211/212* (2013.01)

(58) Field of Classification Search
CPC .... F15B 1/024; F15B 15/224; F15B 2201/32; F15B 2211/212
See application file for complete search history.

(56) References Cited

U.S. PATENT DOCUMENTS

| | | | | |
|---|---|---|---|---|
| 3,863,676 A | * | 2/1975 | Tarsha ...................... | F15B 1/24 138/31 |
| 3,962,956 A | * | 6/1976 | Jacobellis ............. | F16K 31/122 91/418 |
| 4,393,751 A | * | 7/1983 | Kelley .................. | F15B 15/224 137/513.3 |
| 5,536,150 A | * | 7/1996 | Tucker .................. | F04B 47/145 417/390 |

(Continued)

FOREIGN PATENT DOCUMENTS

JP    2004-150985     5/2004
JP    4352262 B2      7/2009

*Primary Examiner* — F. Daniel Lopez
(74) *Attorney, Agent, or Firm* — John P. White; Cooper & Dunham LLP

(57) ABSTRACT

Disclosed herein is a three-stage hydraulic actuator. The three-stage hydraulic actuator includes a pressurizing chamber, a distribution chamber and an acceleration chamber. The pressurizing chamber has therein separated spaces respectively charged with compressed gas and compressed oil. The distribution chamber is provided to communicate with the pressurizing chamber and is charged with oil pressurized by the compressed oil charged into the pressurizing chamber. The acceleration chamber communicates with the distribution chamber through a distributing orifice. An acceleration piston is installed in the acceleration chamber and is moved forward when the pressurized oil is supplied from the distribution chamber to the acceleration chamber.

10 Claims, 8 Drawing Sheets

(56) References Cited

U.S. PATENT DOCUMENTS

| | | | |
|---|---|---|---|
| 7,104,052 B1 * | 9/2006 | Hindman | A01D 34/246 |
| | | | 60/413 |
| 7,171,888 B2 * | 2/2007 | Boecker | F15B 11/0413 |
| | | | 91/394 |
| 8,567,185 B1 * | 10/2013 | Theobald | B25J 9/144 |
| | | | 60/413 |
| 2003/0115863 A1 * | 6/2003 | Holt | E02F 9/2207 |
| | | | 60/414 |
| 2008/0190286 A1 * | 8/2008 | Gram | F15B 15/202 |
| | | | 92/172 |

* cited by examiner

THREE-STAGE HYDRAULIC ACTUATOR AND METHOD OF OPERATING THE SAME

CROSS REFERENCE TO RELATED APPLICATION(S)

This application claims the benefit of Korean Patent Application No. 10-2013-0149419, filed on Dec. 3, 2013, which is hereby incorporated by reference in its entirety into this application.

BACKGROUND OF THE INVENTION

1. Technical Field

The present invention generally relates to hydraulic actuators for applying impulse to a mass in a collision test so that the mass moves at a predetermined speed and methods of operating the hydraulic actuators and, more particularly, to a three-stage hydraulic actuator configured such that compressed oil is supplied into an acceleration chamber through a distributing orifice that opens when an acceleration piston moves forward, whereby the acceleration piston accelerates a mass, and to a method of operating the three-stage hydraulic actuator.

2. Description of the Related Art

Shock test apparatuses for use in shock tests include an actuator for accelerating a mass in a short time and moving the mass at a predetermined speed to simulate shock applied to a target.

For instance, such an actuator is designed such that a piston is slidably installed in a cylinder. When hydraulic pressure is supplied into the cylinder, the piston pushes the mass and thus accelerates it.

As such, the mass can be accelerated and moved at a predetermined speed by applying hydraulic pressure to the mass and pushing it. In this way, shock tests for simulating actual conditions can be conducted.

To increase the speed of the mass, the speed of the piston must be increased to a sufficient degree. For this, the magnitude of supplied hydraulic pressure must be increased to a desired degree. In addition, hydraulic pressure must be supplied in a short time.

However, increasing hydraulic pressure to push the piston is limited. Give this, methods such as increasing the capacity of a pressure accumulator or increasing the lengths of the cylinder and the piston have been used. In this case, a comparatively high flow rate is required to move a heavy mass at a high speed. Increases in size and length of the cylinder and the piston and use of several large pressure accumulators cause a problem of an excessive increase in size of equipment.

SUMMARY OF THE INVENTION

Accordingly, the present invention has been made keeping in mind the above problems occurring in the prior art, and an object of the present invention is to provide a three-stage hydraulic actuator configured such that when it is operated, an acceleration piston moves forward and opens a distributing orificedistributing orifice so that hydraulic oil rapidly enters an acceleration chamber and accelerates the acceleration piston, thus preventing a pressure drop, and to a method of operating the three-stage hydraulic actuator.

In order to accomplish the above object, in an aspect, the present invention provides a three-stage hydraulic actuator, including: a pressurizing chamber having therein separated spaces respectively charged with compressed gas and compressed oil; a distribution chamber communicating with the pressurizing chamber, the distribution chamber being charged with oil pressurized by the compressed oil charged into the pressurizing chamber; and an acceleration chamber communicating with the distribution chamber through a distributing orifice, with an acceleration piston installed in the acceleration chamber, the acceleration piston being moved forward when the pressurized oil is supplied from the distribution chamber to the acceleration chamber. When the acceleration piston begins to move forward, the pressurized oil charged in the distribution chamber is supplied from the distribution chamber into the acceleration chamber through the distributing orifice, whereby a mass connected to the acceleration piston is accelerated.

A first slider may be installed in the pressurizing chamber so as to be slidable while an outer circumferential surface of the first slider makes contact with an inner surface of the pressurizing chamber. The compressed gas and the compressed oil may be charged into the spaces separated from each other by the first slider.

A gas port may be provided on an upper end of the pressurizing chamber so that the compressed gas is supplied into or discharged from the pressurizing chamber through the gas port. An oil port may be provided on a lower end of the pressurizing chamber so that the compressed oil is supplied into or discharged from the pressurizing chamber through the gas port. The first slider may slide between the gas port and the oil port.

A second slider may be installed in the distribution chamber so as to be slidable while an outer circumferential surface of the second slider makes contact with an inner surface of the distribution chamber.

An oil inlet may be provided on a lower end of the distribution chamber so that compressed oil is supplied into the distribution chamber through the oil inlet.

The pressurizing chamber may comprise a plurality of pressurizing chambers arranged in parallel to each other, and lower ends of the pressurizing chambers are connected to the distribution chamber.

The distributing orifice may be closed or opened by sliding of the acceleration piston. A side surface of the acceleration piston may close the distributing orifice. When the acceleration piston moves forward, the distributing orifice may open.

An oil inlet may be provided on a first end of the acceleration chamber so that compressed oil is supplied from a starting accumulator into the acceleration chamber. An oil outlet may be provided on the acceleration chamber at a position adjacent to the oil inlet so that the compressed oil is discharged from the acceleration chamber through the oil outlet. A returning gas port may be provided on a second end of the acceleration chamber so that compressed gas is supplied from a returning accumulator into the acceleration chamber or discharged from the acceleration chamber through the returning gas port.

The starting accumulator may comprise a plurality of starting accumulators arranged in parallel to each other.

A stopper may be provided between the pressurizing chamber and the distribution chamber so that downward movement of the first slider is limited by the stopper.

The gas may be nitrogen gas.

In another aspect, the present invention provides a method of operating the three-stage hydraulic actuator including: a pressurizing chamber having therein separated spaces respectively charged with compressed gas and compressed oil; a distribution chamber communicating with the pressurizing chamber, the distribution chamber being charged with oil pressurized by the compressed oil charged into the pressurizing chamber; and an acceleration chamber communicating with the distribution chamber through a distributing orifice, with an acceleration piston installed in the acceleration chamber, the acceleration piston being moved forward when the pressurized oil is supplied from the distribution chamber to the acceleration chamber. The method includes: a gas charging operation of charging compressed oil into an upper portion of the pressurizing chamber; a first oil charging operation of charging compressed oil into the distribution chamber; a second oil charging operation of charging compressed oil into a lower portion of the pressurizing chamber; an acceleration-piston driving operation of supplying compressed oil into the acceleration chamber and beginning to move the acceleration piston forward; and an acceleration operation of moving the acceleration piston forward and supplying the compressed oil charged in the distribution chamber into the acceleration chamber through the distributing orifice formed between the distribution chamber and the acceleration chamber, thus accelerating a mass connected to the acceleration piston.

A pressure of the compressed air charged in the second oil charging operation may be higher than a pressure of the compressed air charged in the gas charging operation.

The method may further include, after the acceleration operation is conducted, an acceleration-piston returning operation of returning the acceleration piston to an initial position thereof.

A speed of the mass may be controlled by a pressure of the compressed air charged into the pressurizing chamber in the second oil charging operation.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
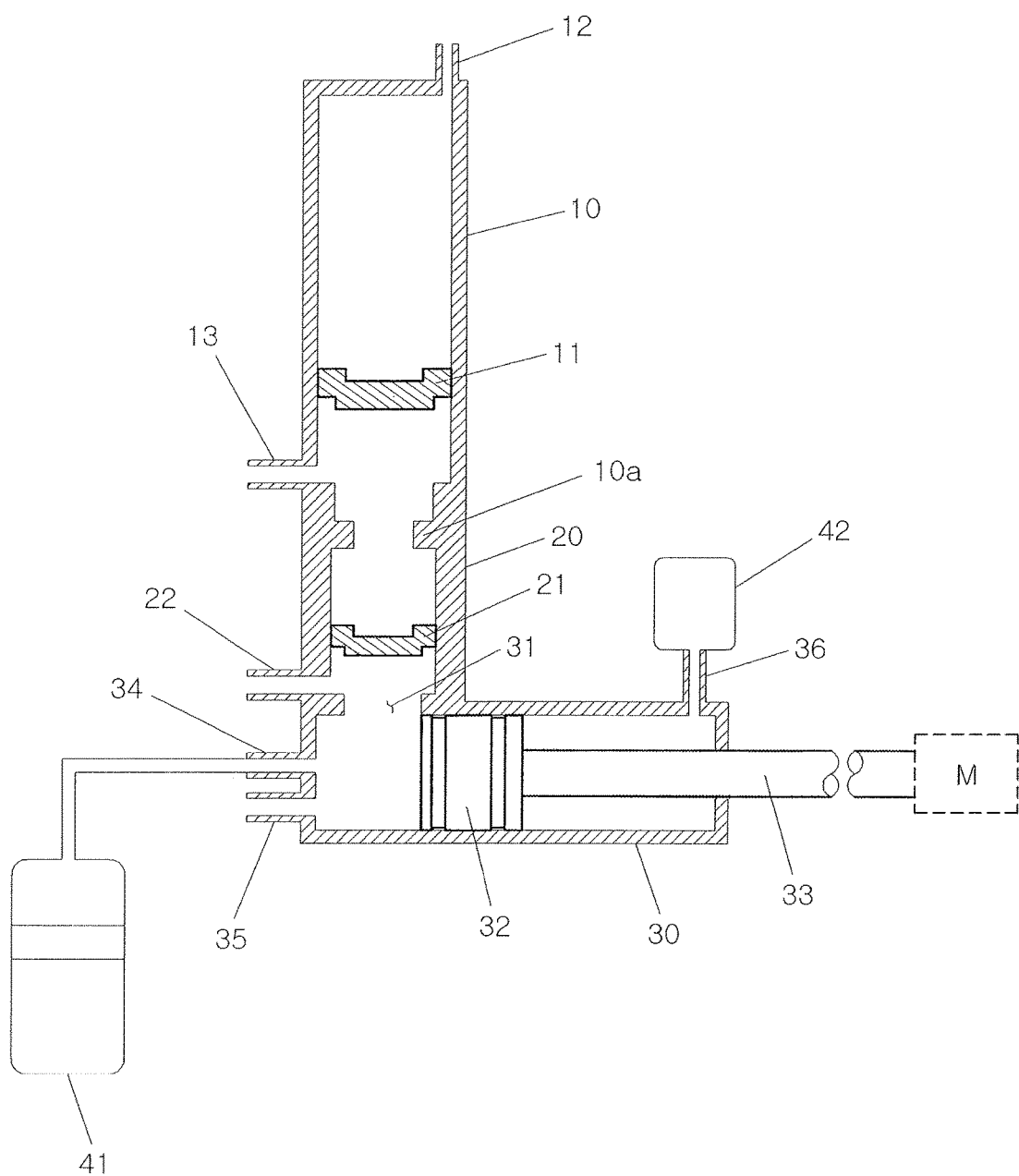
FIG. 1 is a sectional view illustrating a three-stage hydraulic actuator according to the present invention.

Hereinafter, a three-stage hydraulic actuator according to an embodiment of the present invention will be described in detail with reference to the accompanying drawings.

The three-stage hydraulic actuator according to the embodiment of the present invention includes: a pressurizing chamber 10 having separated spaces respectively charged with compressed gas and compressed oil; a distribution chamber 20 that is installed to communicate with the pressurizing chamber 10 and is charged with another oil to be compressed by the oil charged in the pressurizing chamber 10; and an acceleration chamber 30 that communicates with the distribution chamber 20 through a distributing orifice 31 and is provided with an acceleration piston 32 moving forward when compressed oil is supplied from the distribution chamber 20 into the acceleration chamber 30.

The separated spaces in the pressurizing chamber 10 are respectively charged with compressed gas and compressed oil. The pressurizing chamber 10 has a cylindrical structure and is configured such that compressed gas is supplied into or discharged from the pressurizing chamber 10 through a predetermined portion thereof and compressed oil is supplied into or discharged from the pressurizing chamber 10 through another portion thereof.

A first slider 11 is slidably installed in the pressurizing chamber 10. The first slider 11 functions not only to separate the gas from the oil but also to transmit pressure from either the gas or the oil to the other. The first slider 11 is designed such that an outer circumferential surface thereof comes into close contact with an inner surface of the pressurizing chamber 10. Therefore, the first slider 11 separates the gas and the oil from each other in the pressurizing chamber 10. In addition, when the pressure of either the gas or the oil is increased, the first slider 11 slides to transmit the pressure to the other.

A gas port 12 is provided on an upper end of the pressurizing chamber 10 so that compressed gas is supplied into or discharged from the pressurizing chamber 10 through the gas port 12. An oil port 13 is provided on a lower end of the pressurizing chamber 10 so that compressed oil is supplied into or discharged from the pressurizing chamber 10 through the oil port 13. That is, based on the first slider 11, compressed gas is charged into an upper portion of the pressurizing chamber 10 while compressed oil is charged into a lower portion of the pressurizing chamber 10. The compressed gas may be, for example, nitrogen gas. The first slider 11 slides between the gas port 12 and the oil port 13.

The distribution chamber 20 is disposed below the lower end of the pressurizing chamber 10 and is designed to communicate with the pressurizing chamber 10 The distribution chamber 20 is charged with compressed oil. A second slider 21 is installed in the distribution chamber 20. An upper end of the distribution chamber 20 communicates with the lower end of the pressurizing chamber 10 so that compressed oil in the pressurizing chamber 10 is drawn into the distribution chamber 20 and the pressure of the compressed oil is transmitted from the pressurizing chamber 10 to the distribution chamber 20. Oil that is charged into the distribution chamber 20 is independent from oil that is charged into the pressurizing chamber 10.

The second slider 21 is designed such that it can slide in the distribution chamber 20 while an outer circumferential surface thereof comes into close contact with an inner surface of the distribution chamber 20. Compressed oils are charged into portions above and below the second slider 21 in the distribution chamber 20. The second slider 21 functions to transmit the pressure of oil disposed above the second slider 21 to oil disposed below the second slider 21.

An oil port 22 is provided on a lower end of the distribution chamber 20 so that compressed oil is supplied from the outside into the distribution chamber 20 or discharged therefrom to the outside through the oil port 22.

Determining the lowest limit of the first slider 11, a stopper 10a is provided between the pressurizing chamber 10 and the distribution chamber 20. Hence, the first slider 11 can be moved downward only to the stopper 10a in the pressurizing chamber 10.

The acceleration chamber 30 is disposed below the lower end of the distribution chamber 20 and is designed to communicate with the distribution chamber 20. The acceleration chamber 30 has a cylindrical structure. A distributing orifice 31 is formed in a portion of a circumferential surface of the acceleration chamber 30 so that the acceleration chamber 30 communicates with the distribution chamber 20 through the distributing orifice 31. Thus, compressed oil can be drawn into the acceleration chamber 30 through the distributing orifice 31.

The acceleration piston 32 is slidably installed in the acceleration chamber 30. The acceleration piston 32 is connected to a mass M by a connection rod 33 so that the mass M is accelerated when the acceleration piston 32 moves forward.

The acceleration chamber 30 is oriented in a direction approximately perpendicular to the pressurizing chamber 10 and the distribution chamber 20. The reason for this is to design the actuator such that the acceleration piston 32 opens the distributing orifice 31 when moving forward.

An oil inlet 34 and an oil outlet 35 are provided on a first end of the acceleration chamber 30 so that compressed oil for use in moving the acceleration piston 32 forward at an initial stage is supplied into the acceleration chamber 30 through the oil inlet 34, and oil is discharged from the acceleration chamber 30 through the oil outlet 35 when the acceleration piston 32 is returned to its initial position. A returning gas port 36 is provided on a second end of the acceleration chamber 30 that is opposed to the first end thereof so that compressed gas is supplied from the outside into the acceleration chamber 30 through the returning gas port 36 so as to return the acceleration piston 32 to its initial position.

The oil inlet 34 is connected to a starting accumulator 41 for use in supplying compressed oil to move the acceleration piston 32 forward at the initial stage. The returning gas port 36 is connected to a returning accumulator 42 for use in supplying compressed gas to return the acceleration piston 32 that has been moved forward to its original position.

Meanwhile, the pressurizing chamber 10 may comprise a plurality of pressurizing chambers 10 so as to increase the flowrate of oil applied to the acceleration piston 32.

Figure 6:
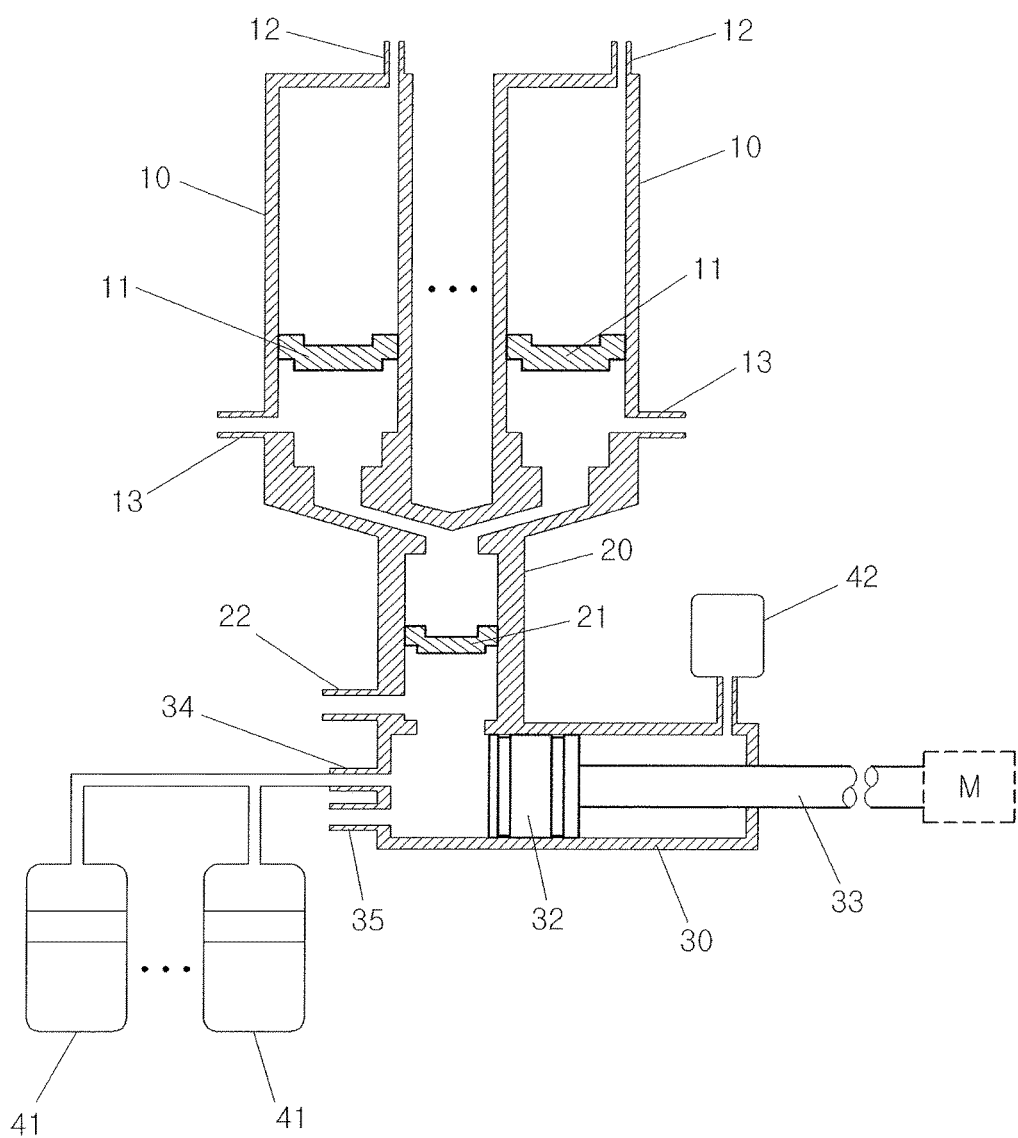
FIG. 6 is a sectional view illustrating a three-stage hydraulic actuator provided with a plurality of pressurizing chambers according to another embodiment of the present invention.

For instance, as shown in FIG. 6, a plurality of pressurizing chambers 10 are provided and arranged in parallel to each other. The pressurizing chambers 10 are designed to communicate with the distribution chamber 20. In this case, the flowrate applied to the acceleration chamber 30 can be increased. If n number of pressurizing chambers 10 are provided, the flowrate transmitted to the acceleration chamber 30 is n times as high as that of the case using a single pressurizing chamber 10 in theory.

Preferably, a plurality of starting accumulators 41 arranged in parallel to each other are connected to the oil inlet 34 of the acceleration chamber 30. More preferably, the number of drive pressurestarting accumulators 41 is the same as that of the acceleration chambers 30.

Hereinafter, a method of operating the three-stage hydraulic actuator according to the present invention will be described.

Figure 2:
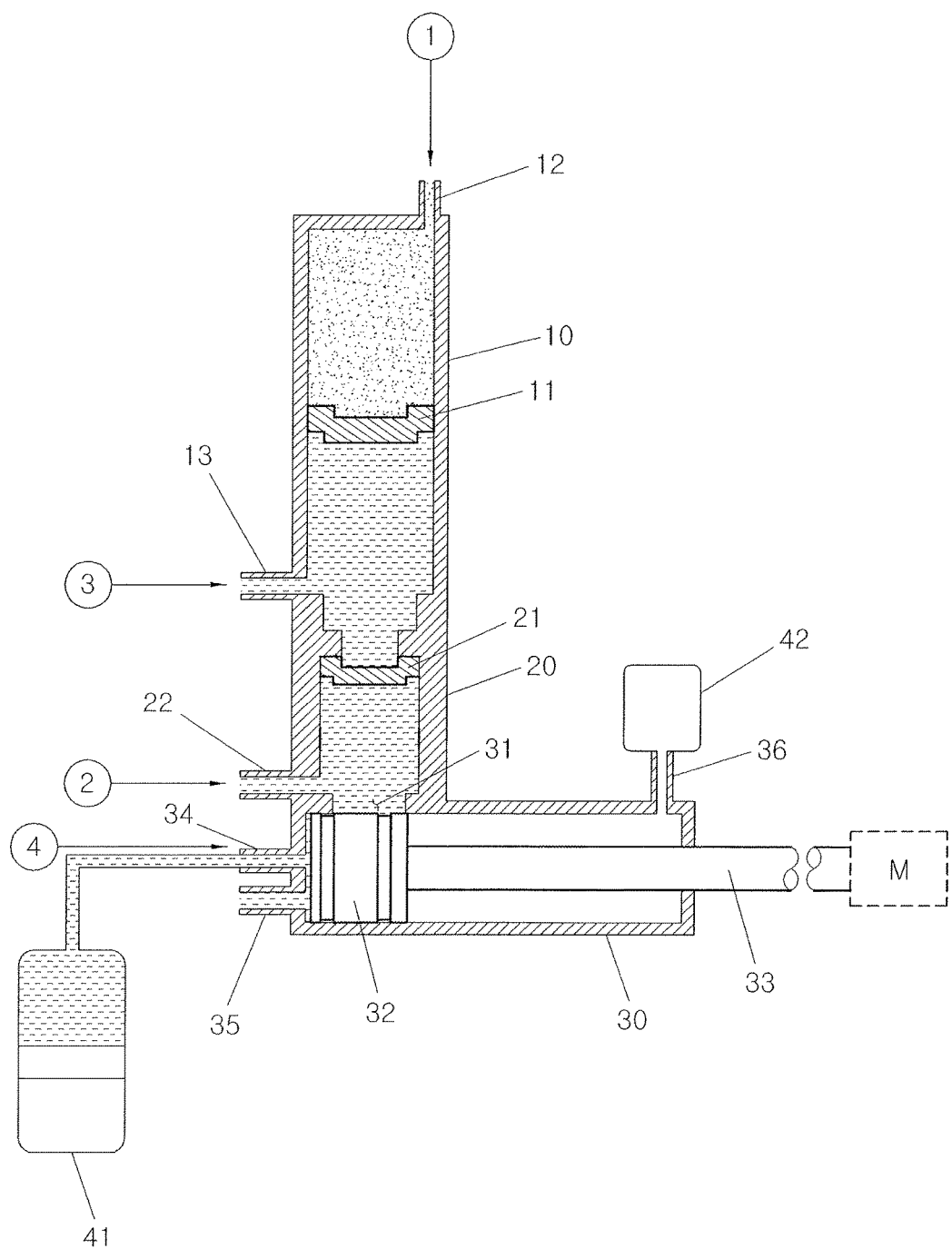
FIG. 2 is a sectional view illustrating the three-stage hydraulic actuator charged with compressed gas and oil according to the present invention.

A gas charging operation S110 includes supplying compressed gas into the pressurizing chamber 10 and filling space in the pressurizing chamber 10 with the compressed gas (refer to ① of FIG. 2). That is, compressed gas is supplied into the pressurizing chamber 10 through the gas port 12 so that the internal space of the pressurizing chamber 10, particularly, the space above the first slider 11 in the pressurizing chamber 10, is filled with compressed gas. Preferably, gas charged into the pressurizing chamber 10 is nitrogen gas.

A first oil charging operation S120 includes supplying compressed oil into the distribution chamber 20 and filling space in the distribution chamber 20 with the compressed gas (refer to ② of FIG. 2). The oil charged into the distribution chamber 20 is supplied later to the acceleration chamber 30 later for use in moving the acceleration piston 32 forward.

A second oil charging operation S130 includes supplying compressed oil into the pressurizing chamber 10 (refer to ③ of FIG. 2). Compressed oil is charged into the pressurizing chamber 10 through the oil port 13 of the pressurizing chamber 10. In the second oil charging operation S130, if compressed oil is charged into the pressurizing chamber 10, the pressurizing chamber 10 enters conditions in which the upper portion of the pressurizing chamber 10 is filled with compressed gas and the lower portion of the pressurizing chamber 10 is filled with compressed oil. The pressure of the oil charged into the pressurizing chamber 10 is higher than the pressure of the gas charged into the pressurizing chamber 10. Therefore, the pressurizing chamber 10 is in conditions in which the pressurizing chamber 10 is filled with oil and gas by the pressure of the compressed oil because the pressure of the compressed oil in the pressurizing chamber 10 is also transmitted to the gas in the pressurizing chamber 10 through the first slider 11. For example, if at an initial stage gas is charged under a pressure of 100 bar and then oil is charged under a pressure of 150 bar, the pressure of the oil in the pressurizing chamber 10 is also transmitted to the gas in the pressurizing chamber 10 through the first slider 11. Consequently, the pressure of the gas in the pressurizing chamber 10 also becomes 150 bar.

An acceleration-piston driving operation S140 includes beginning to move the acceleration piston 32 from the initial position. In the acceleration-piston driving operation S140, compressed oil is supplied from the starting accumulator 41 into the acceleration chamber 30 (refer to ④ of FIG. 2) so that the acceleration piston 32 is moved forward from the initial position. In the acceleration-piston driving operation S140, the acceleration piston 32 is moved forward from the initial position only a degree so as to open the distributing orifice 31 between the distribution chamber 20 and the acceleration chamber 30 rather than aiming to push and accelerate the mass.

Figure 3:
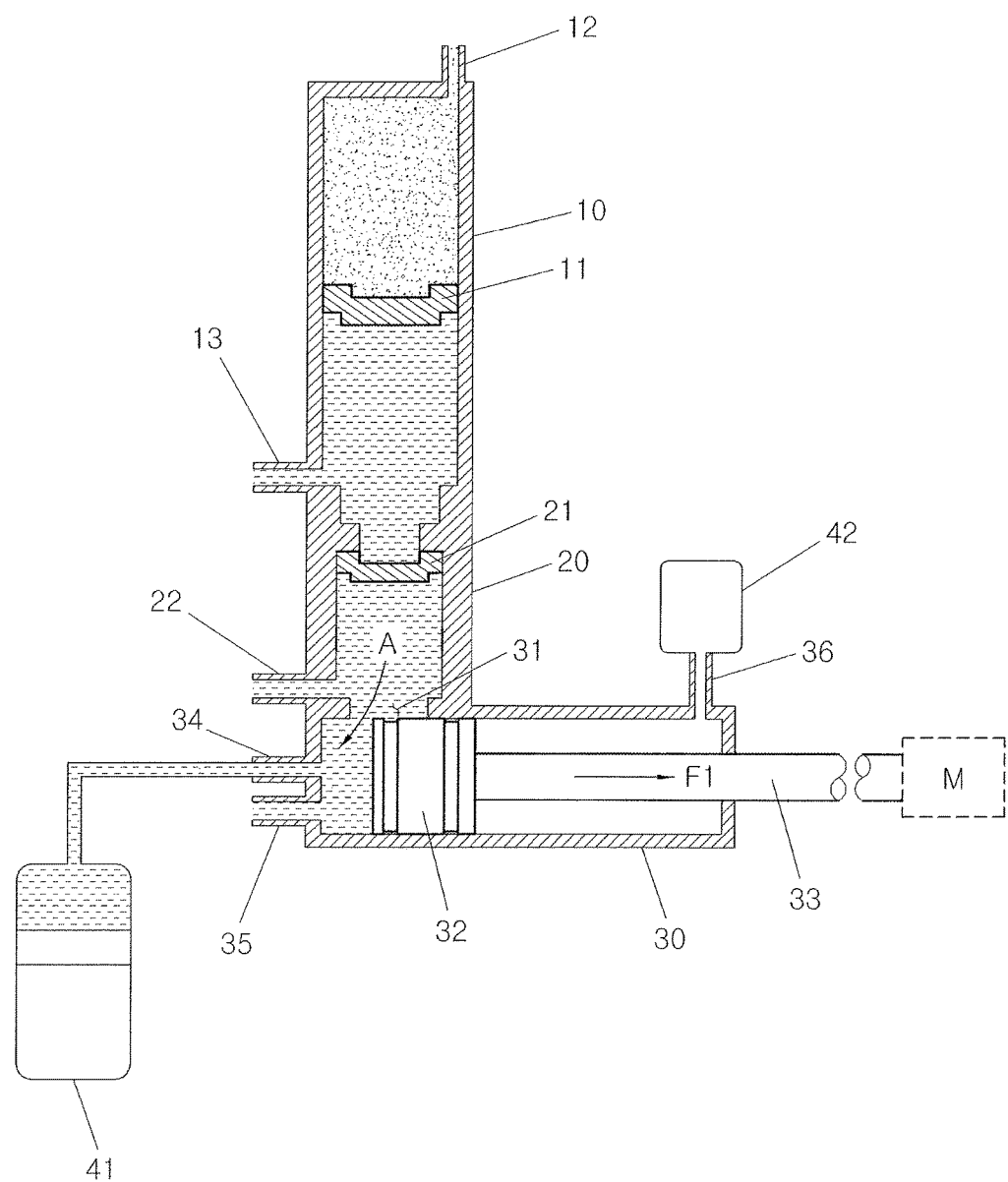
FIG. 3 is a sectional view illustrating conditions of the three-stage hydraulic actuator in which a starting accumulator is operated at an initial stage to move an acceleration piston forward according to the present invention.

An acceleration operation S150 includes continuously supplying compressed oil into the acceleration chamber 30 through the starting accumulator 41 and further moving the acceleration piston 32 forward so that the distributing orifice 31 that has been closed by the acceleration piston 32 is opened. If the acceleration piston 32 is continuously moved forward from the initial position, a side surface of the acceleration piston 32 begins to open the distributing orifice 31 communicating the distribution chamber 20 with the acceleration chamber 30 (refer to arrow F1 of FIG. 3). That is, when the acceleration piston 32 is at the initial position, the distributing orifice 31 is closed by the acceleration piston 32 so that the compressed oil charged in the distribution chamber 20 cannot be moved to the acceleration chamber 30. However, if the acceleration piston 32 is moved forward, the distributing orifice 31 begins to open, and compressed oil that has been charged in the distribution chamber 20 is supplied into the acceleration chamber 30 through the distributing orifice 31.

Figure 4:
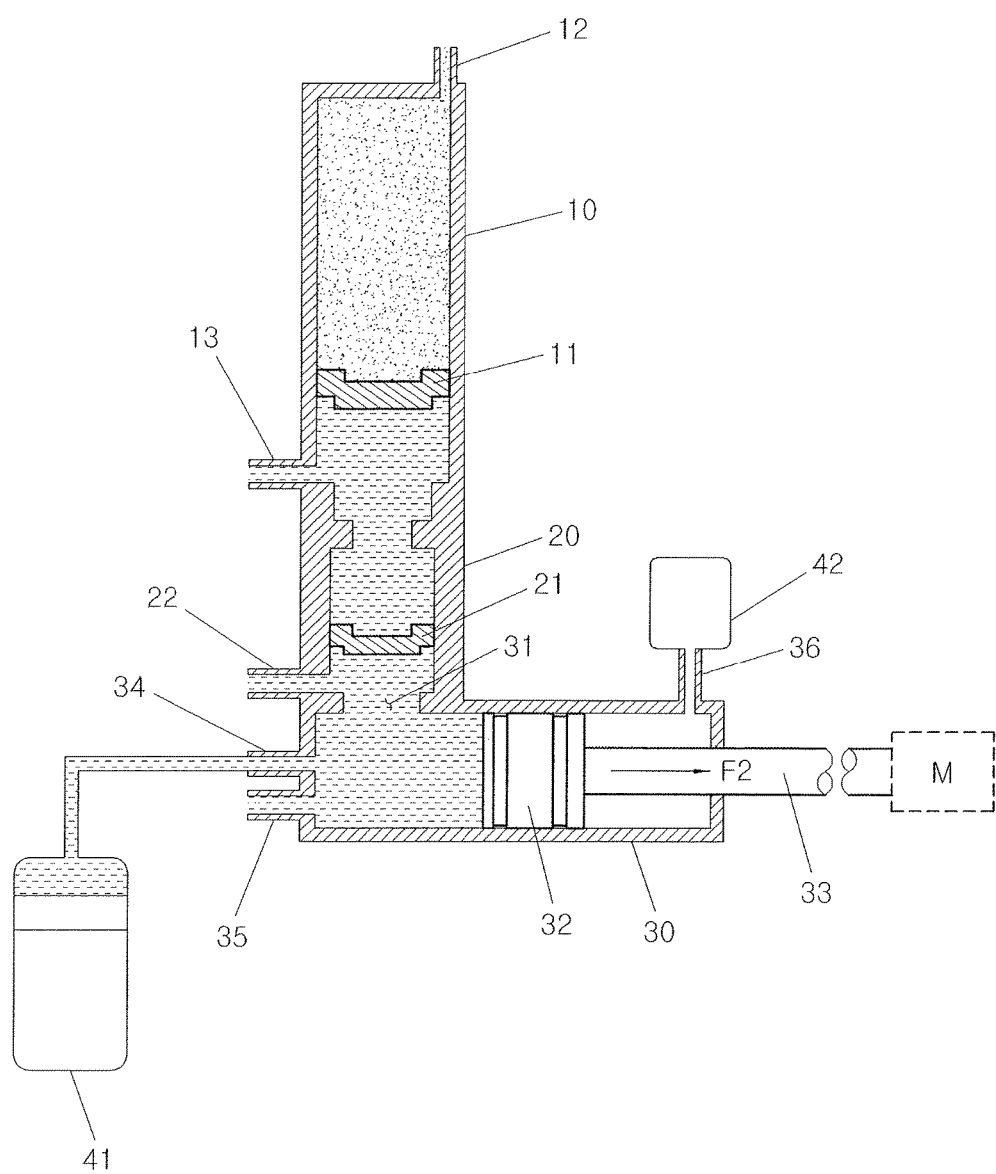
FIG. 4 is a sectional view illustrating conditions of the three-stage hydraulic actuator in which compressed oil is supplied to an acceleration chamber and thus the acceleration piston accelerates a mass according to the present invention.

If the compressed oil is supplied from the distribution chamber 20 into the acceleration chamber 30, the acceleration piston 32 is further moved forward. When the acceleration piston 32 is further moved forward, the distributing orifice 31 is further opened. Then, a larger amount of oil is drawn from the distribution chamber 20 into the acceleration chamber 30. Through such a series of processes, the acceleration piston 32 can move forward in a short time, thus accelerating the mass M connected to the acceleration piston 32, as designated by arrow F2 of FIG. 4.

Particularly, because the oil in the distribution chamber 20 using not only its own pressure but also the pressure of the gas and oil charged in the pressurizing chamber 10 is applied to the oil in the distribution chamber 20, the acceleration piston 32 can be accelerated at a sufficient high speed when the oil is supplied from the distribution chamber 20 to the acceleration chamber 30. The oil charged in the distribution chamber 20 is reduced in pressure after the oil begins to be supplied from the distribution chamber 20 to the acceleration chamber 30; however, in the present invention, the pressure of the gas and oil charged in the pressurizing chamber 10 is applied to the oil in the distribution chamber 20 to reduce the pressure drop of the oil in the distribution chamber 20. In other words, when the distributing orifice 31 opens, the pressure in the distribution chamber 20 is reduced while oil in the distribution chamber 20 is supplied into the acceleration chamber 30 through the distributing orifice 31. However, the pressure of the oil in the pressurizing chamber 10 is applied to the distribution chamber 20, whereby the oil can be supplied from the distribution chamber 20 to the acceleration chamber 30 under sufficient pressure. Furthermore, when the pressure of the oil in the pressurizing chamber 10 is reduced by supply of oil from the pressurizing chamber 10 to the distribution chamber 20, the pressure of the gas in the pressurizing chamber 10 is transmitted to the oil in the pressurizing chamber 10 and then finally transmitted to the oil in the distribution chamber 20.

Meanwhile, as the oil and gas in the pressurizing chamber 10 and the distribution chamber 20 are moved, the first slider 11 and the second slider 21 are moved downward. In detail, the first slider 11 slides in the pressurizing chamber 10 such that the space above the first slider 11 and the space therebelow can maintain equilibrium in pressure. When the oil is moved from the pressurizing chamber 10 to the distribution chamber 20, the pressure of the space below the first slider 11 is reduced and the pressure of the space above the first slider 11 is increased. Thereby, the first slider 11 is moved downward. In the same manner, when the oil that has been charged into the distribution chamber 20 is drawn into the acceleration chamber 30, the second slider 21 is also moved downward because the pressure of the space below the second slider 21 is reduced and the pressure of the space thereabove is increased.

As such, in the acceleration operation S150, the distribution chamber 20 communicates with the acceleration chamber 30; therefore, the oil that has been in the distribution chamber 20 is drawn into the acceleration chamber 30, thus pushing the acceleration piston 32. The gas and oil that have been charged in the pressurizing chamber 10 provide energy required for the oil of the distribution chamber 20 to move the acceleration piston 32. Hence, the mass M connected to the acceleration piston 32 can be rapidly moved and accelerated in a short time.

An acceleration-piston returning operation S160 includes supplying compressed gas into the acceleration chamber 30 through the returning gas port 36 to return the acceleration piston 32 to its original position after all of the oil that has been in the distribution chamber 20 is supplied to the acceleration chamber 30.

Figure 5:
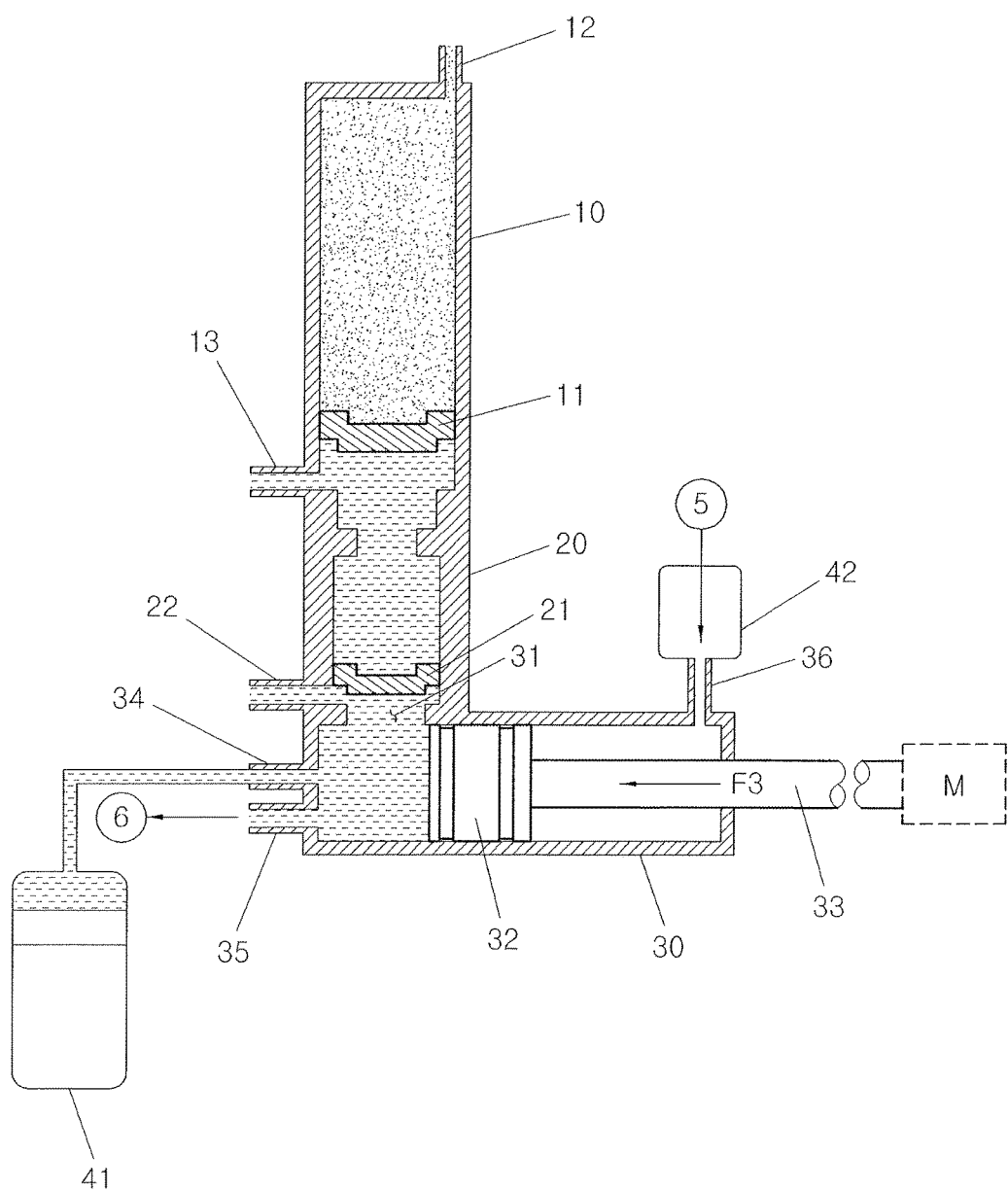
FIG. 5 is a sectional view illustrating conditions of the three-stage hydraulic actuator in which a returning accumulator is operated to move the acceleration piston backward according to the present invention.

If compressed air is supplied into the acceleration chamber 30 through the returning gas port 36 (refer to ⑤ of FIG. 5) while the oil outlet 35 of the acceleration chamber 30 is open, the acceleration piston 32 is moved in the direction of arrow F3 of FIG. 5 and returned to its original position. Oil that has been charged into the acceleration chamber 30 is discharged to the outside through the oil outlet 35 (refer to ⑥ of FIG. 5).

Figure 7:
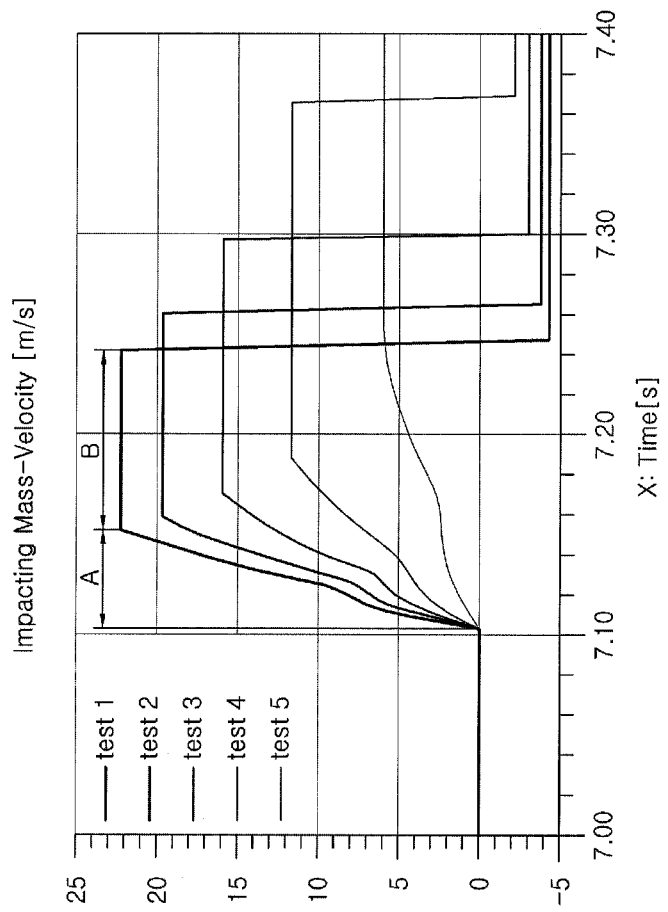
FIG. 7 is a graph showing a speed distribution of the mass depending on an initial oil charging pressure in the three-stage hydraulic actuator according to the present invention.
Figure 8:
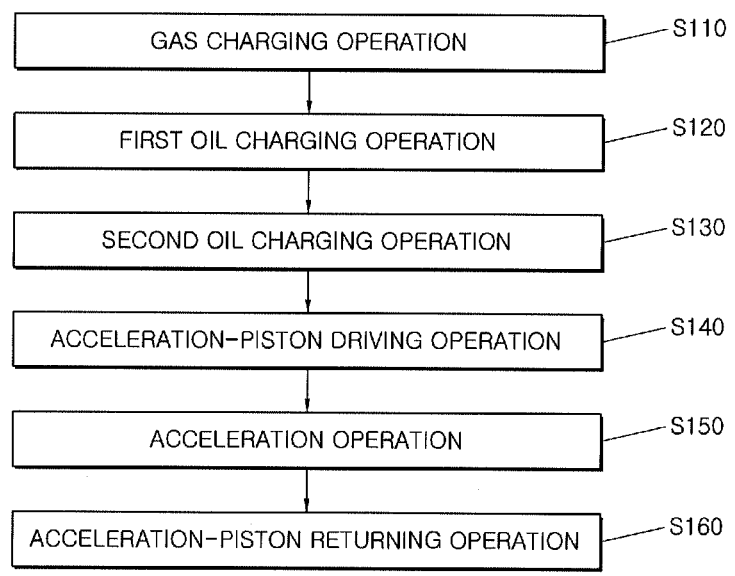
FIG. 8 is a flowchart of a method of operating the three-stage hydraulic actuator according to the present invention.

FIG. 7 illustrates speed distribution of the mass M according to the pressure of oil charged into the pressurizing chamber 10 in the three-stage hydraulic actuator and the method of operating the three-stage hydraulic actuator in accordance with the present invention.

In FIG. 7, test 1 indicates the case where the pressure of oil charged into the pressurizing chamber 10 is highest, and test 5 indicates the case where it is lowest. As the pressure of oil charged into the pressurizing chamber 10 is increased, the time it takes to accelerate the mass M to a predetermined speed is reduced and the speed of the mass M is increased. In the case of test 1, the slope in an acceleration section A is higher than those of the other cases, so that it can be appreciated that the mass M is rapidly accelerated. Furthermore, a constant speed section B of the case of test 1 is located higher than those of the other cases, so that it can be understood that the speed of the mass M is higher than those of the other cases.

As such, the speed of the mass M depends on the pressure of oil charged into the pressurizing chamber 10. If it is desired to rapidly accelerate the mass M, the pressure of oil charged into the pressurizing chamber 10 should be increased. That is, as the pressure of oil charged into the pressurizing chamber 10 in the second oil charging operation S130 is increased, the speed of the mass M increases.

As described above, the present invention provides a three-stage hydraulic actuator and a method of operating the same. The three-stage hydraulic actuator according to the present invention is configured such that compressed oil for use in moving an acceleration piston forward is supplied through a distributing orifice that is opened as the acceleration piston is moved forward, rather than through a separate valve. Therefore, an area of space through which oil is supplied from a distribution chamber to an acceleration chamber can be increased while oil is supplied to the acceleration chamber. Thereby, structural stability of the actuator can be enhanced, and compressed oil can be rapidly supplied to the acceleration chamber. Consequently, a mass can be accelerated to a desired speed in a short time.

Moreover, a plurality of pressurizing chambers may be provided. In this case, a flow rate of oil supplied to the acceleration chamber can be markedly increased, whereby high-speed collision of the mass can be easily induced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-stage hydraulic actuator, comprising:
   a pressurizing chamber having therein separated spaces respectively charged with compressed gas and compressed oil charged into the pressurizing chamber;
   a distribution chamber communicating with the pressurizing chamber, the distribution chamber being charged with oil pressurized by the compressed oil charged into the pressurizing chamber;
   a slider disposed in the distribution chamber, to be slidable while an outer circumferential surface of the slider makes contact with an inner surface of the distribution chamber; and
   an acceleration chamber communicating with the distribution chamber through a distributing orifice, with an acceleration piston installed in the acceleration chamber, the acceleration piston being moved forward when an oil inlet disposed perpendicular to the distribution chamber on a first end of the acceleration chamber supplies compressed oil from a starting accumulator into the acceleration chamber in a first compressed oil supplying operation which begins to open the distributing orifice, and the acceleration piston being accelerated further forward in a second compressed oil supplying operation in which the pressurized oil which is charged in the distribution chamber is supplied from the distribution chamber to the acceleration chamber through the distributing orifice when the distributing orifice begins to open as a result of the first compressed oil supplying operation, whereby a mass connected to the acceleration piston is accelerated,
   wherein the distributing orifice is closed or opened by sliding of the acceleration piston, a side surface of the acceleration piston closes the distributing orifice, and an opening capacity of the distributing orifice becomes larger as the acceleration piston is moved forward,
   wherein the compressed oil is discharged from the acceleration chamber through an oil outlet disposed on the acceleration chamber, at a position adjacent to the oil inlet,
   wherein compressed gas is supplied from a returning accumulator into the acceleration chamber or discharged from the acceleration chamber through a returning gas port disposed on a second end of the acceleration chamber, and
   wherein the pressurizing chamber comprises a plurality of pressurizing chambers arranged in parallel to each other, and lower ends of the pressurizing chambers are connected to the distribution chamber.

2. The three-stage hydraulic actuator as set forth in claim 1, wherein another slider is installed in the pressurizing chamber so as to be slidable while an outer circumferential surface of said another slider makes contact with an inner surface of the pressurizing chamber,
   wherein the compressed gas and the compressed oil are charged into the spaces separated from each other by said another slider.

3. The three-stage hydraulic actuator as set forth in claim 2, wherein
   a gas port is provided on an upper end of the pressurizing chamber so that the compressed gas is supplied into or discharged from the pressurizing chamber through the gas port,
   an oil port is provided on a lower end of the pressurizing chamber so that the compressed oil is supplied into or discharged from the pressurizing chamber through the oil port, and
   said another slider slides between the gas port and the oil port.

4. The three-stage hydraulic actuator as set forth in claim 2, wherein a stopper is provided between the pressurizing chamber and the distribution chamber so that downward movement of said another slider is limited by the stopper.

5. The three-stage hydraulic actuator as set forth in claim 1, wherein an oil port is provided on a lower end of the distribution chamber so that compressed oil is supplied into the distribution chamber through the oil port.

6. The three-stage hydraulic actuator as set forth in claim 1, wherein the starting accumulator comprises a plurality of starting accumulators arranged in parallel to each other.

7. The three-stage hydraulic actuator as set forth in claim 1, wherein the compressed gas comprises nitrogen gas.

8. A method of operating a three-stage hydraulic actuator comprising a pressurizing chamber having therein separated spaces respectively charged with compressed gas and compressed oil charged into the pressurizing chamber, a distribution chamber communicating with the pressurizing chamber, the distribution chamber being charged with oil pressurized by the compressed oil charged into the pressurizing chamber, the pressurizing chamber comprising a plurality of pressurizing chambers arranged in parallel to each other, and lower ends of the pressurizing chambers are connected to the distribution chamber, a slider installed in the distribution chamber so as to be slidable while an outer circumferential surface of the slider makes contact with an inner surface of the distribution chamber and an acceleration chamber communicating with the distribution chamber through a distributing orifice, with an acceleration piston installed in the acceleration chamber, the method comprising:
   a gas charging operation of charging compressed gas into an upper portion of the pressurizing chamber;
   a first oil charging operation of charging compressed oil into the distribution chamber;
   a second oil charging operation of charging compressed oil into a lower portion of the pressurizing chamber;
   an acceleration-piston driving operation of supplying, by an oil inlet disposed perpendicular to the distribution chamber on a first end of the acceleration chamber, compressed oil from a starting accumulator into the acceleration chamber and beginning to move the acceleration piston forward which begins to open the distributing orifice;
   an acceleration operation of accelerating the acceleration piston further forward by supplying compressed oil charged in the distribution chamber into the acceleration chamber through the distributing orifice formed between the distribution chamber and the acceleration chamber when the distributing orifice begins to open as a result of the acceleration-piston driving operation, thus accelerating a mass connected to the acceleration piston;
   an acceleration-piston returning operation of returning the acceleration piston to an initial position thereof by supplying compressed gas from a returning accumulator into the acceleration chamber through a returning gas port provided on a second end of the acceleration chamber, and discharging compressed oil from the acceleration chamber through an oil outlet provided on the acceleration chamber at a position adjacent to the oil inlet, the distributing orifice being closed or opened by sliding of the acceleration piston, and a side surface of the acceleration piston closing the distributing orifice, an opening capacity of the distributing orifice becoming larger as the acceleration piston is moved forward.

9. The method as set forth in claim 8, wherein a pressure of the compressed gas charged in the second oil charging operation is higher than a pressure of the compressed gas charged in the gas charging operation.

10. The method as set forth in claim 8, wherein a speed of the mass is controlled by a pressure of the compressed gas charged into the pressurizing chamber in the second oil charging operation.

* * * * *